No. 710,877. Patented Oct. 7, 1902.
C. METTERHAUSEN.
BRAKE MECHANISM FOR VEHICLES.
(Application filed June 7, 1902.)
(No Model.) 3 Sheets—Sheet 3.
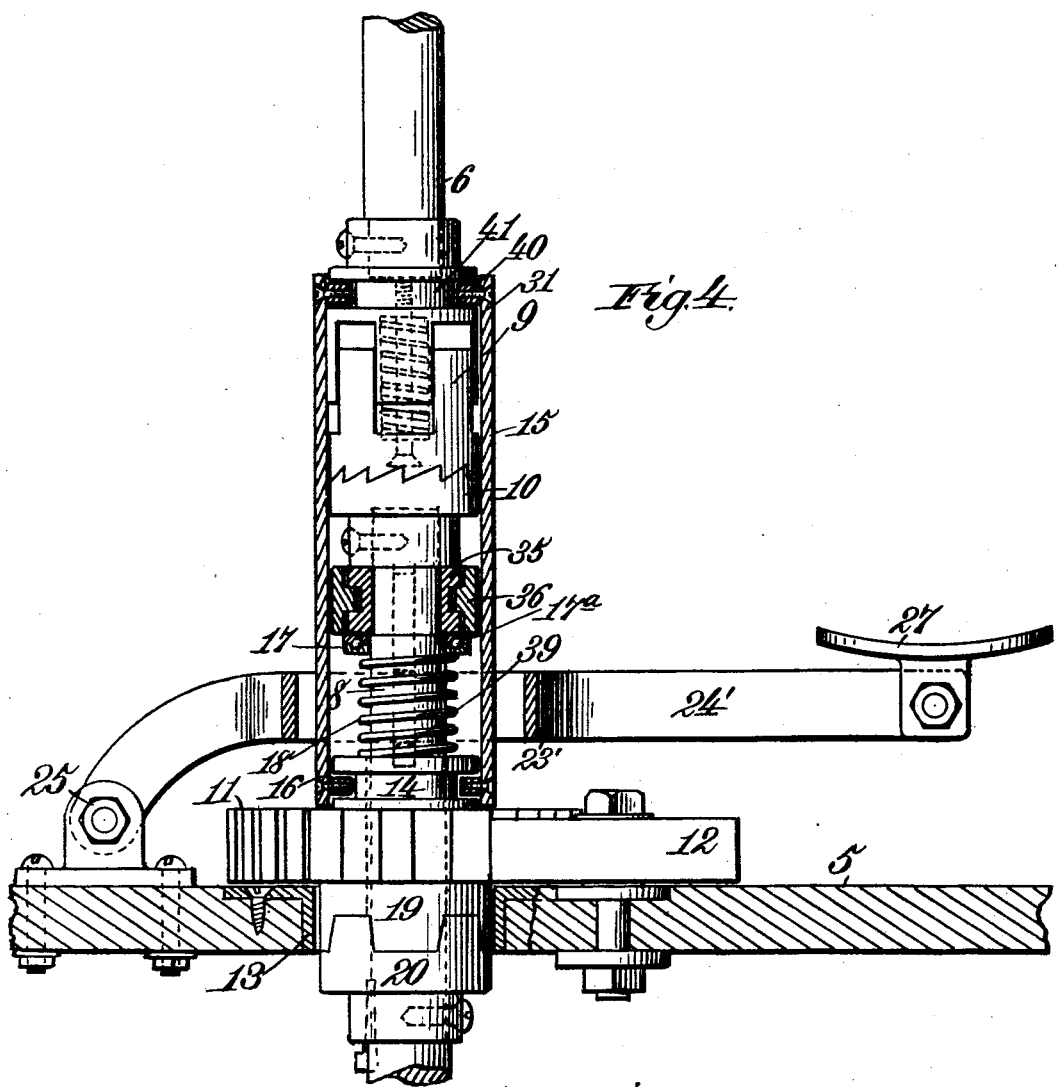
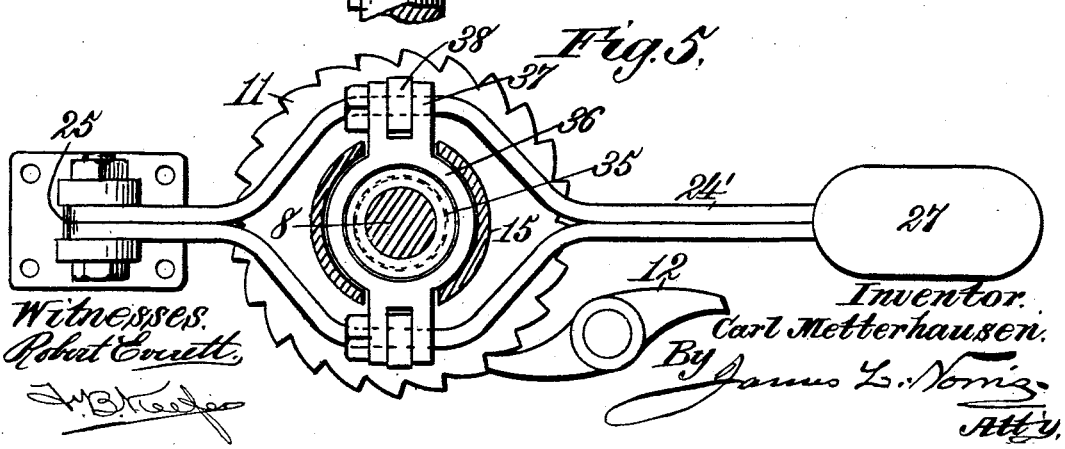
Witnesses.
Inventor.
Carl Metterhausen.
THE NORRIS PETERS CO., PHOTO-LITHO., WASHINGTON, D. C.

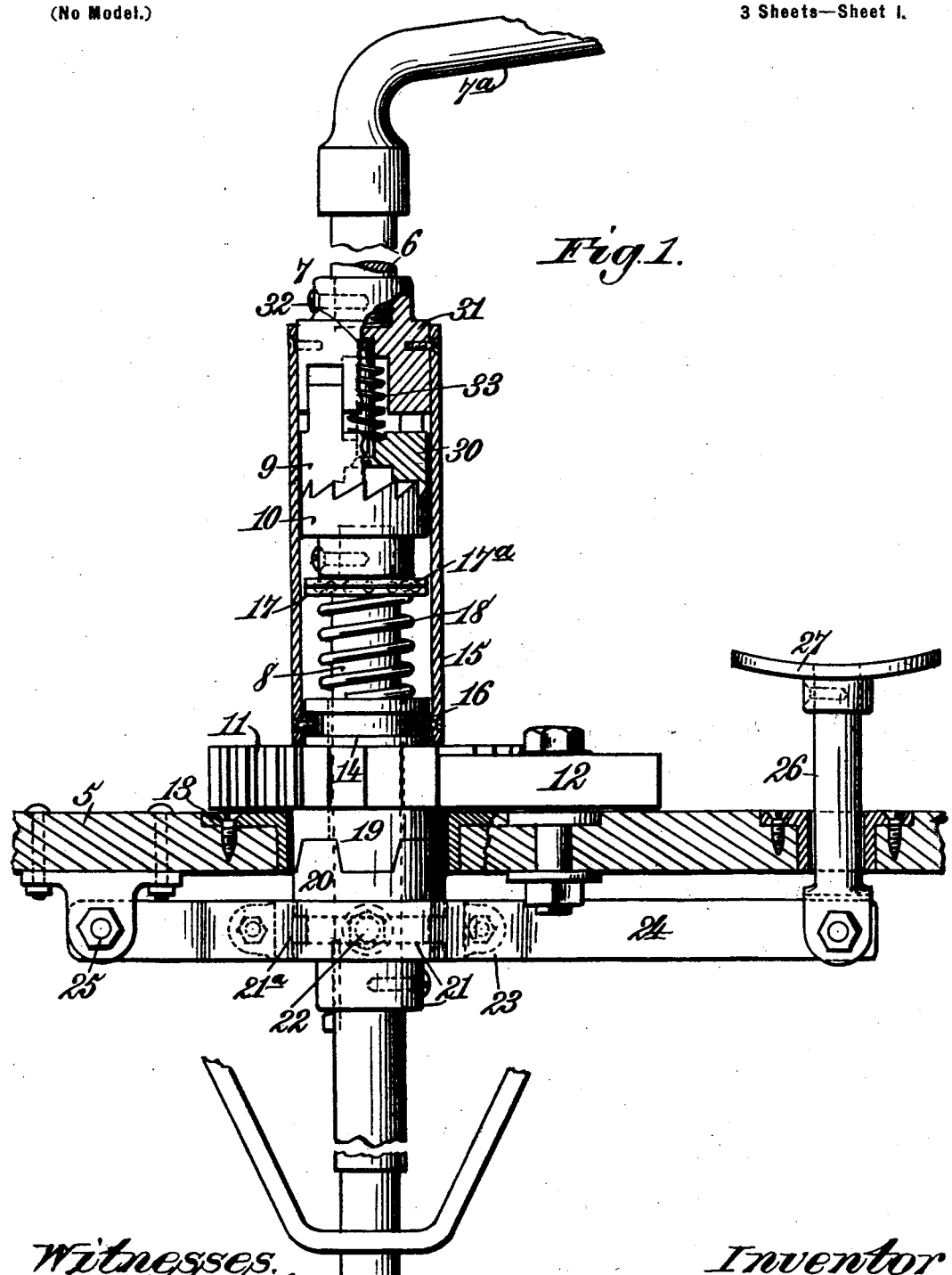

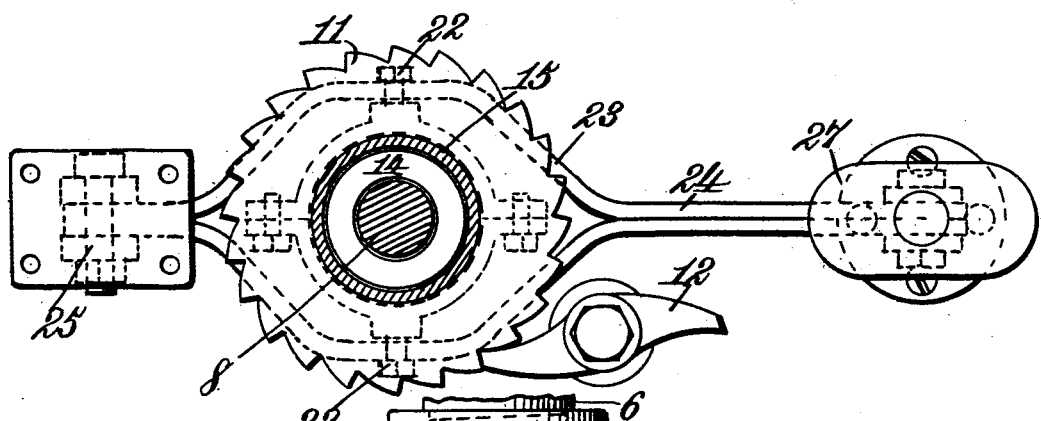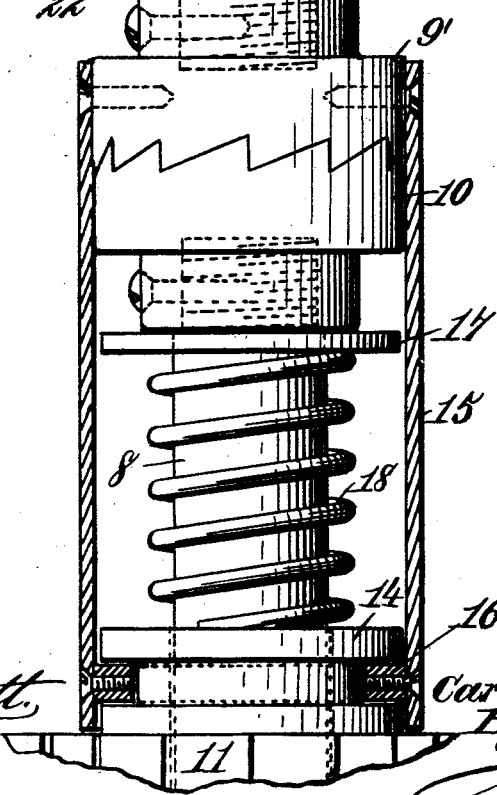

UNITED STATES PATENT OFFICE.

CARL METTERHAUSEN, OF CHICAGO, ILLINOIS.

BRAKE MECHANISM FOR VEHICLES.

SPECIFICATION forming part of Letters Patent No. 710,877, dated October 7, 1902.

Application filed June 7, 1902. Serial No. 110,670. (No model.)

*To all whom it may concern:*

Be it known that I, CARL METTERHAUSEN, a citizen of the United States, residing at Chicago, in the county of Cook and State of Illinois, have invented new and useful Improvements in Brake Mechanism for Vehicles, of which the following is a specification.

This invention relates to brake mechanism for vehicles, and it is adapted for effective installation in all kinds of the latter, it being primarily intended for use in connection with electric cars and the like; and the principal object of the invention is to provide simple means for securing the instantaneous release of the brake or brakes without the necessity of operating the usual brake-handle or releasing the pawl of detent mechanism controlling such brake-handle by virtue of which the brake-staff can be placed inside the vestibule and close to the front of the same, and preferably the brake includes a ratchet mechanism by which the brake or brakes can be set by an oscillatory instead of a full rotary movement. Ordinarily, however, the brake-handle often where such ratchet mechanism is present will be swung around, if the motorman or gripman does not hold the same when the usual brake mechanism is released, with such force as to injure him or any person or persons in the vicinity of the brake-handle. With the improved releasing mechanism, however, there is no possibility of the brake-handle swinging around when the releasing mechanism for the brake or brakes is actuated.

The improved brake mechanism includes the following elements in combination, to wit: a brake-staff in sections, one of which is operatively connected with the brake or brakes of the car, a clutch adapted normally to couple the staff-sections, detent mechanism coöperative with the brake-staff and adapted to normally prevent reverse rotation of said staff, a second clutch coöperative with the detent and brake-staff, and means for simultaneously disconnecting the halves of the respective clutches. The detent mechanism mentioned serves to prevent the reverse rotation of the staff when the brake is set, and when the clutch-halves are operated in unison they serve to disconnect the staff from the detent mechanism, so that said staff is free to rotate independently of such detent mechanism, and also to uncouple the two sections of the staff, so that what in the present case is the lower one can turn without affecting the upper one, to which the brake-setting handle is operatively connected.

I will set forth in the following description other objects and advantages of the invention, while the novelty thereof will constitute the basis of the claims succeeding such description, and said invention is clearly illustrated in the accompanying drawings, forming a part of this specification.

Figure 1 is a central longitudinal section of the brake mechanism including my invention. Fig. 2 is a horizontal sectional plan view. Fig. 3 is a view similar to Fig. 1 of a portion of the mechanism with the ratchet removed. Fig. 4 is a view corresponding to Fig. 1 and showing a modified arrangement. Fig. 5 is a view corresponding with Fig. 2 of said modified arrangement.

Like characters refer to like parts in all the drawings.

Referring now more particularly to Fig. 1, the numeral 5 indicates a portion of the platform of a car, and 6 indicates a brake-staff extending vertically through same, which by reason of my improvements can be placed close to the dash and close to the vestibule end of the car. The brake-staff is suitably mounted, and the lower end thereof is operatively connected with the usual brake or brakes in some familiar manner, although I have not deemed it necessary to show such connections, and said staff consists of two sections 7 and 8. The staff-sections 7 and 8 terminate at their adjacent ends in clutch-halves 9 and 10, respectively, which are normally coupled, so that when the upper section 7 of the staff is operated by the usual brake-handle the lower section of said staff will be correspondingly operated, so as to set the brake or brakes. The respective portions 9 and 10 of the clutch may be secured fixedly to their coöperative staff-sections 7 and 8 in any convenient manner. The lower section 8 of the staff is surrounded by a ratchet-wheel 11, which is free of the same and which is adapted to coöperate with a pawl or dog 12, pivoted upon the upper side of the platform 5 and in proximity to said ratchet-wheel, said ratchet-wheel being adapted to rotate on the wear-plate 13, countersunk into said platform. A hub or boss projects upwardly centrally from the ratchet-wheel 11 and is encased in the lower end of a barrel or sleeve 15, said hub or boss 14 being peripherally channeled or grooved to receive the two-part collar 16, the respective parts of which are fastened inside the sleeve or barrel 15, near the lower end thereof. As will hereinafter appear, the barrel 15, Fig. 1, turns with the upper section of the brake-staff 6, and during this operation the ring 16 will of course rotate in the channel of the hub 14. The rings 17 encircle the lower section of the brake-staff and carry between them a circular series of antifriction-rollers 17ª, fitted in suitable pockets therein, and the lower section 10 of the clutch hereinbefore mentioned works against the upper ring. A coiled spring 18 surrounds the brake-staff section 8 within the barrel 15 and bears at its ends against the upper face of the hub 14 and the under face of the lower one of the rings 17, the function of the said coiled spring being to hold the teeth of the respective clutch-halves 10 and 9 normally in engagement, so that when the upper section of the staff is rotated by the motorman or other operator the lower section will be likewise operated to set the brake or brakes. A clutch-section 19 depends centrally from the ratchet-wheel 11 and coöperates with the clutch-half 20 upon the sleeve 21, connected with the lower end of the section 8 of the staff for rotation therewith. The collar 21 is peripherally grooved to receive the split ring or collar 21ª, having lugs at diametrically opposite sides to receive the pins 22 upon the yoke 23 of the lever 24, said yoke surrounding the lower portion of the staff. The lever 24 is fulcrumed at 25 at one side of the brake-staff, while its opposite end has pivoted thereto the rod or spindle 26, which extends upward therefrom and through a reinforced perforation in the car-platform 5, said spindle having at its upper end a footpiece or plate 27, suitably secured thereto. With the parts arranged as shown in Fig. 1 and when the upper section 7 of the brake-staff is turned by the brake-handle 7ª, Fig. 1, the lower section 8 will be operated through the medium of the clutch-halves 9 and 10, which are normally coupled and held in such relation by the coiled spring 18. During this rotation of the staff by the brake-handle the pawl 12 rides over the teeth of the ratchet 11, so as to prevent the reverse rotation of said ratchet, and hence of the staff, it being apparent that the ratchet-wheel 11 is at this time coupled to the staff by means of the clutch-halves 19 and 20. To release the brake, it is simply necessary to lower the treadle by depressing the footpiece 27, which operation carries the clutch-halves 20 and 19 out of engagement, thereby throwing the detent mechanism, consisting of a pawl and ratchet, out of coöperative relation with the staff and simultaneously disconnecting the clutch-halves 10 and 9, whereby the lower section of the brake-staff 8 can be reversely operated without affecting the operation of the upper staff-section to which the handle is connected, so that, notwithstanding the fact that the motorman's hand is not on the brake-handle, it cannot be rotated or partially rotated when the clutch members 9 and 10 are out of engagement.

It will be seen that the spring 18 in addition to holding the clutch-halves 9 and 10 in engagement performs a like office for the clutch-sections 19 and 20, and consequently upholds the treadle or foot-lever 24.

The barrel 15, to which reference has hereinbefore been made, incases the upper clutch coöperative with the staff-sections and also the spring 18, which holds said clutch-halves in coöperative relation.

The clutch-half 9 is composed of superposed sections 30 and 31, constituting in themselves clutch members and having engaging teeth. The upper of these clutch-halves is rigidly secured to the barrel 15 by suitable means. A screw 32 connects the parts 30 and 31 and extends freely through a central opening in the lower part 30 and is tapped into the upper part 31. This screw 32 is surrounded by the coiled spring 33, the ends of which fit in relatively shallow sockets in the superposed members 30 and 31, respectively. The lower member 30 has a sliding movement upon the screw 32 a distance equaling the depth of the teeth between the coöperative clutch members 9 and 10, the members 31 and 30 being normally held apart by the spring 33. It will be understood that the member 30 of the clutch-half 9 is yieldingly mounted.

The clutch member 9, constructed as just set forth, is adapted for use in connection with the solid brake-handles or those having in themselves no ratchet mechanism, it being intended as a substitute for and constituting, in effect, a ratchet mechanism. The intermeshing teeth of the parts 9 and 10 have alternate straight and beveled faces. When the upper section of the brake-staff 6 is operated in a direction to set the brakes, the straight faces of the teeth of the clutch-half 9 will engage the straight faces of the lower clutch-half, so as to actuate the lower section 8 of the staff, and on the backward motion of the upper section of the staff the beveled faces of the teeth of the upper clutch-half 9 will ride idly over the corresponding faces of the teeth of the lower clutch-half 10, by virtue of which the brake can be set by an oscillatory instead of by a rotary motion, as is usually done with the solid brake-handles operated in connection with the ordinary single-piece staffs. While the said solid brake-handle is being rotated it rotates the upper staff-section 7 and, through the clutch-halves 9 and 10, the lower staff-section, and on the reverse or backward stroke of the said handle, when the beveled faces of the teeth of the upper clutch-half 9 ride idly over the teeth of the lower clutch-half 10, the lower member 30 will of course be thrust upward, thereby compressing the spring 33, which as soon as a rear stroke is completed serves to force the teeth into proper engagement.

The ratchet mechanism just described may be used without the hereinbefore-described releasing mechanism.

Referring to Fig. 3, I have shown a mechanism adapted for use in combination with those kinds of brake-handles having ratchet mechanisms for setting the brake or brakes by an oscillatory or swinging movement. In this modified form of construction the upper clutch-half 9 is not divided, as is the upper clutch-half 9 in the form of mechanism illustrated in Fig. 1.

In Fig. 4 I have shown a modified arrangement wherein the lower section of the staff 6 is also moved longitudinally to simultaneously disconnect the halves with the two clutches by a treadle mounted upon the upper side of the platform 5, and in Fig. 4 I will use the same characters to denote corresponding parts as employed in the preceding figures. The foot-lever 24' has a footpiece connected to its free end thereof, and it has at a suitable point a yoke 23', surrounding the barrel 15. The lower section 8 of the staff 6, just under the clutch-half 10, is provided with a peripherally-grooved collar 35, suitably fastened thereto, the groove of which is adapted to receive an annular flange upon the inside of the collar 36. This collar 36 has diametrically opposite ears or lugs 37 extending through longitudinal slots in the barrel 15 and to which the links 38 are pivoted, said links depending from said lugs or ears and terminating in hooks 39, adapted to be engaged by the under side of the yoke 23' at diametrically opposite sides thereof. When the operator depresses the lever 24', the halves of the two clutches are thrown out of operative relation, so as to secure the release of the brake mechanism. The clutch-half 9 is shown as divided exactly like the other clutch-half; but it need not be, for it may be solid, as indicated by the clutch-half 9' in Fig. 3.

In the form of the device shown by Figs. 4 and 5 the barrel 15 does not turn, of course, for it is not secured fixedly to the upper section 7 of the brake-staff. Said barrel has upon its upper inside a split ring 40, suitably secured in place and fitted in a circumferential groove 41 in the upper section of the clutch-half 9, the latter turning in said barrel.

The invention may be materially modified within the scope of the appended claims.

Having described the invention, what I claim is—

1. The combination of a brake-staff in sections, a clutch adapted normally to couple the staff-sections, detent mechanism coöperative with said brake-staff, a second clutch coöperative with the detent mechanism and brake-staff respectively, and means for simultaneusly disconnecting the halves of the respective clutches.

2. The combination of a brake-staff in sections, a clutch adapted normally to couple the staff-sections, and consisting of two parts, one of which is yieldingly mounted relative to the other, detent mechanism coöperative with the brake-staff, a second clutch coöperative with the detent mechanism and brake-staff respectively, and means for simultaneously disconnecting the halves of the respective clutches.

3. The combination of a brake-staff in sections, a clutch adapted normally to couple the staff-sections, one of the halves of the clutch consisting of two parts, a screw uniting said two parts, and one of the latter being capable of movement on the screw, a spring surrounding said screw and bearing against said parts, detent mechanism coöperative with the brake-staff, and a second clutch coöperative with the detent mechanism and brake-staff respectively, and means for simultaneously disconnecting the halves of the respective clutches.

4. The combination of a brake-staff in sections, a clutch adapted normally to couple the staff-sections, a pawl and ratchet, the ratchet surrounding one of the sections of the staff and being free of the same, a second clutch coöperative respectively with the ratchet and with the staff-section which it surrounds, and means for simultaneously disconnecting the halves of the respective clutches.

5. The combination of a brake-staff in sections, a clutch the halves of which are fixed to the respective sections of the staff, detent mechanism coöperative with the staff, a second clutch coöperative with the detent mechanism and brake-staff, and means for simultaneously disconnecting the halves of the respective clutches.

6. The combination of a brake-staff in sections, a clutch the halves of which are rotative with the respective sections of the staff, a ratchet-wheel loose on one of the brake-staff sections, a pawl coöperative with said ratchet-wheel, a second clutch, one half of which is secured to said ratchet-wheel, the other half thereof being fastened to the staff-section around which said ratchet-wheel is disposed, and means under the control of the operator to longitudinally shift said last-mentioned brake-staff section.

7. The combination of a brake-staff in sections, a clutch the halves of which are rotative with the respective sections of the staff, a ratchet-wheel loose on one of the brake-staff sections, a pawl coöperative with said ratchet, a second clutch, one half of which is secured to said ratchet, the other half being fastened to the staff-section around which said wheel is disposed, a single spring serving to hold the clutch-halves in coöperative relation, and means under the control of the operator to longitudinally shift said last-mentioned brake-staff section.

8. The combination of a brake-staff in sections, a clutch the halves of which are fixed to the respective sections of the staff, a ratchet-wheel loose on one of the brake-staff sections, a pawl coöperative with said ratchet-wheel, a second clutch one half of which is secured to said ratchet-wheel, the other half being fastened to the staff-section around which said ratchet-wheel is disposed, a coiled spring surrounding the staff and bearing against said ratchet-wheel and also against one of the first-mentioned clutch-halves, and means under the control of the operator to longitudinally shift one of the brake-staff sections.

9. The combination of a brake-staff in sections, a clutch the halves of which are rotative with the respective sections of the staff, a ratchet-wheel loose on one of the brake-staff sections, a pawl coöperative with the said ratchet-wheel, a second clutch, one half of which is secured to said ratchet-wheel, and the other half being fastened to the staff-section around which said ratchet-wheel is disposed, and having a peripherally-grooved collar, a split collar fitted in the groove of the other collar, and a foot-operated lever provided with pins to engage said second collar.

10. The combination of a brake-staff in sections, a clutch the halves of which are rotative with the respective sections of the staff, a ratchet-wheel loose on one of the brake-staff sections, a pawl coöperative with said ratchet-wheel, a second clutch, one half of which is secured to said ratchet-wheel and the other half being fastened to the staff-section around which said ratchet-wheel is disposed, and a foot-operated lever for actuating said last-mentioned clutch-half.

11. The combination of a brake-staff in sections, a clutch in superposed sections, a clutch the halves of which are rotative with said respective sections of the staff, a ratchet-wheel having a peripherally-grooved hub and through which the lower section of the staff freely extends, a pawl coöperative with the said ratchet-wheel, a second clutch one half of which is secured to said ratchet-wheel, the other half being fastened to the lower staff-section, a sleeve inclosing the upper clutch and the hub of the ratchet-wheel, and having interior thereof a dividing-ring to enter the groove of said hub, and the upper half of the upper clutch being fastened to said barrel, a coiled spring around the lower staff-section and bearing against said hub and lower section of the upper clutch respectively, and means for shifting the lower section of the staff longitudinally.

12. The combination of a brake-staff in sections, and a clutch the halves of which are fixed to the sections of the brake-staff, and one of the clutch-halves consisting of two parts, a pin connecting the latter, and a spring surrounding the pin and bearing against said parts of the clutch-half.

In testimony whereof I have hereunto set my hand in presence of two subscribing witnesses.

CARL METTERHAUSEN.

Witnesses:
W. C. BOLTMANN,
E. E. WALLACE.